US012269294B1

(12) United States Patent
Hackett et al.

(10) Patent No.: US 12,269,294 B1
(45) Date of Patent: Apr. 8, 2025

(54) AXLE BEAM

(71) Applicant: ArvinMeritor Technology, LLC, Troy, MI (US)

(72) Inventors: Bryan Hackett, Troy, MI (US); William Edwards, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/520,813

(22) Filed: Nov. 28, 2023

(51) Int. Cl.
*B60B 35/00* (2006.01)
*B60B 35/04* (2006.01)
*B62D 7/18* (2006.01)

(52) U.S. Cl.
CPC ............ *B60B 35/004* (2013.01); *B60B 35/04* (2013.01); *B62D 7/18* (2013.01)

(58) Field of Classification Search
CPC ........ B60B 35/04; B60B 35/004; B60G 21/05
See application file for complete search history.

(56) References Cited

U.S. PATENT DOCUMENTS

| 6,609,764 | B2 | 8/2003 | Dudding et al. |
| RE40,888 | E | 9/2009 | Dudding et al. |
| 7,862,058 | B2 | 1/2011 | Bubulka et al. |
| 9,050,855 | B2 | 6/2015 | Li et al. |
| 10,421,488 | B2 | 9/2019 | Lam et al. |
| 10,532,752 | B2 * | 1/2020 | Hubmann ................ B61F 1/08 |
| 11,479,060 | B2 * | 10/2022 | Suzuki .................... B60G 9/003 |
| 2011/0079459 | A1 * | 4/2011 | Gottschalk ............... B62D 7/16 |
| | | | 280/93.512 |
| 2015/0048583 | A1 * | 2/2015 | Li .......................... B60B 35/003 |
| | | | 280/93.512 |
| 2018/0029414 | A1 * | 2/2018 | Khanfar ................ B60B 35/06 |

FOREIGN PATENT DOCUMENTS

| AU | 2008232774 A1 * | 10/2009 | ............ B60B 35/08 |
| BR | PI0514182 A * | 6/2008 | |
| CH | 712104 A2 * | 8/2017 | .......... B60B 35/004 |
| CN | 104417263 A * | 3/2015 | ............ B60B 35/00 |
| CN | 112319137 A * | 2/2021 | |
| EP | 1749678 A1 * | 2/2007 | .......... B60B 35/007 |
| EP | 1839906 A1 * | 10/2007 | ............ B60B 35/04 |
| EP | 3895903 A1 * | 2/2021 | ............ B60B 35/04 |
| EP | 2163401 A1 * | 10/2021 | ............ B60B 35/06 |
| WO | WO-2018186372 A1 * | 10/2018 | ................ B21J 5/02 |
| WO | WO-2019172259 A1 * | 9/2019 | .......... B60B 35/007 |

* cited by examiner

*Primary Examiner* — Nicole T Verley
(74) *Attorney, Agent, or Firm* — Brooks Kushman PC

(57) ABSTRACT

An axle beam comprising a beam and first and second kingpin mounting portions. The beam extends along a center plane. The beam may include a top side, a bottom side disposed opposite the top side and one or more flanges. The first and second kingpin mounting portions extend from opposite ends of the beam.

18 Claims, 12 Drawing Sheets

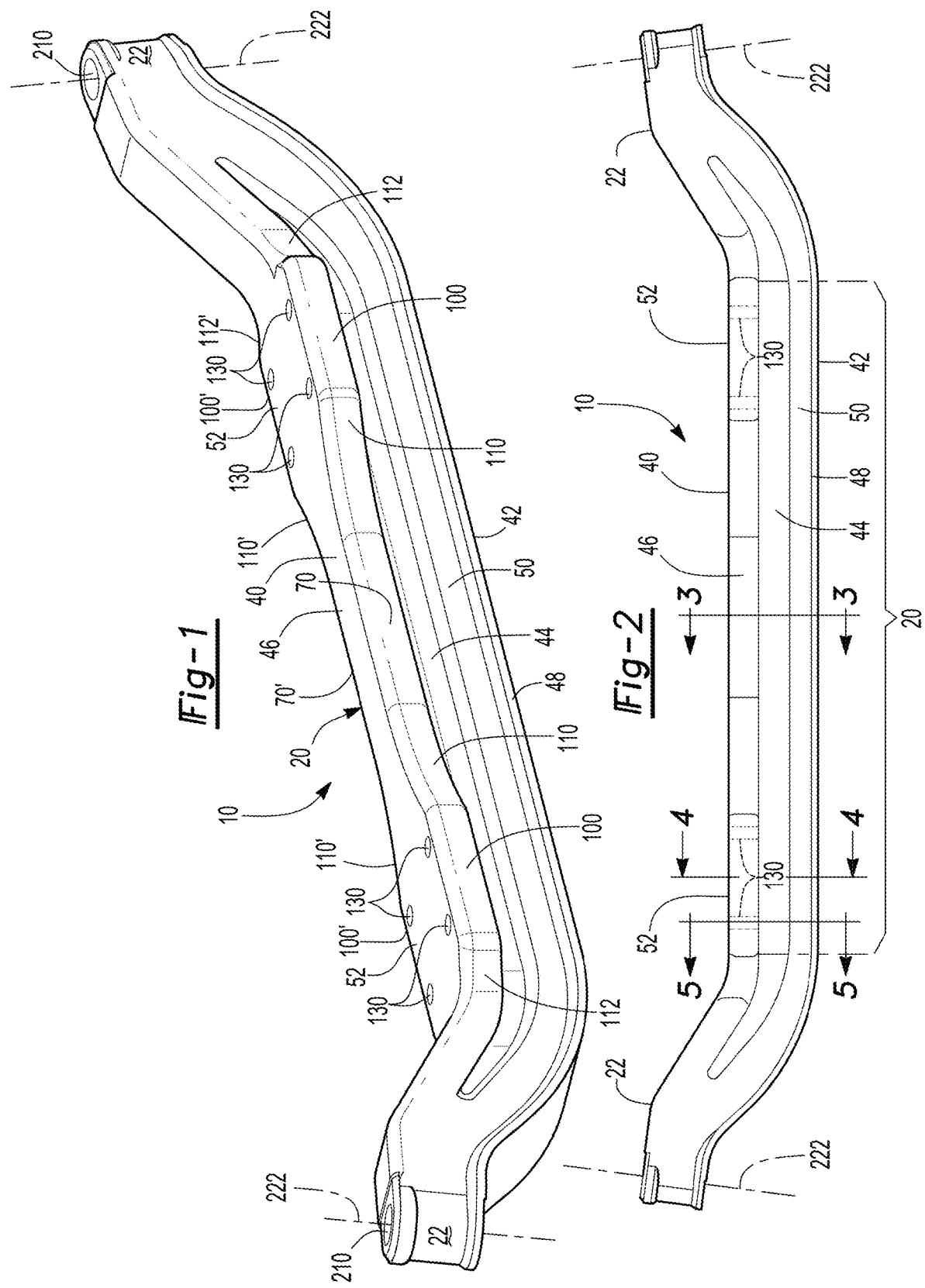

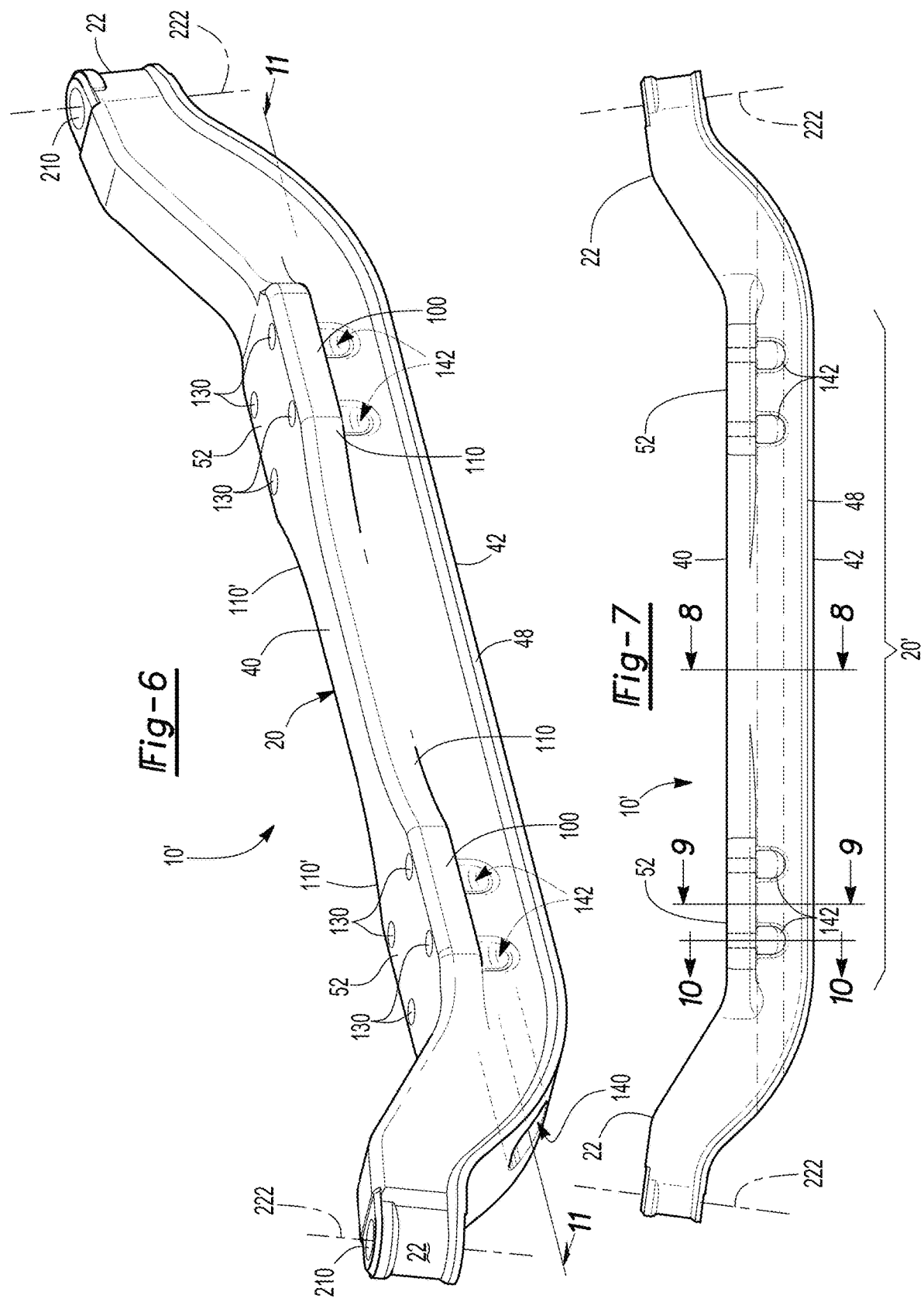

AXLE BEAM

TECHNICAL FIELD

The invention relates to an axle beam and an assembly that includes a steering knuckle mounted to the axle beam.

BACKGROUND

An axle beam is disclosed in U.S. Pat. No. 9,050,855.

SUMMARY

The invention relates to an axle beam. The axle beam comprises a beam and first and second kingpin mounting portions. The beam comprises a top side, a bottom side, a web, a top flange, a bottom flange, and an intermediate flange. The bottom side is disposed opposite the top side. The center plane extends from the top side to the bottom side. The center plane extends through the web. The top flange extends from the top side to the web. The bottom flange extends from the bottom side toward the web. The intermediate flange extends from the bottom flange to the web. The bottom flange protrudes farther from the center plane than the intermediate flange. The first and second kingpin mounting portions extend from opposite ends of the beam.

The top side may be disposed substantially perpendicular to the bottom side. The center plane may be disposed substantially perpendicular to the top side. The center plane may be disposed substantially perpendicular to the bottom side. The center plane may bisect the top flange. The center plane may bisect the web. The center plane may bisect the intermediate flange. The center plane may bisect the bottom flange.

The intermediate flange may protrude farther from the center plane than the web. The top flange may protrude farther from the center plane than the web.

The bottom flange may further comprise a first bottom flange side. The first bottom flange side may extend from the bottom side. The first bottom flange side may face away from the center plane. The bottom flange may further comprise a first bottom flange connecting side. The first bottom flange connecting side may extend from an end of the first bottom flange side to the intermediate flange. The first bottom flange connecting side may be disposed at an oblique angle with respect to the first bottom flange side.

The top flange may further comprise a top flange height. The top flange height may extend along the center plane from the top side to the web. The bottom flange may further comprise a bottom flange height. The bottom flange height may extend along the center plane from the bottom side to the intermediate flange. The top flange height may be greater than the bottom flange height. The intermediate flange may further comprise an intermediate flange height. The intermediate flange height may extend along the center plane from the bottom flange to the web. The top flange height may be greater than the intermediate flange height.

The beam may further comprise a first mounting flange. The first mounting flange may extend from the top side to the web. The first mounting flange may protrude farther from the center plane than the top flange. The first mounting flange may protrude farther from the center plane than the bottom flange. The first mounting flange may protrude farther from the center plane than the intermediate flange. The first mounting flange may protrude farther from the center plane than the web.

The beam may further comprise a second mounting flange. The second mounting flange may extend from the top side to the web. The second mounting flange may protrude farther from the center plane than the top flange. The second mounting flange may protrude farther from the center plane than the bottom flange. The second mounting flange may protrude farther from the center plane than the intermediate flange. The second mounting flange may protrude farther from the center plane than the web. The top flange may extend from the first mounting flange to the second mounting flange.

The bottom flange may further comprise a first bottom flange side. The first bottom flange side may extend from the bottom side. The first bottom flange side may face away from the center plane.

The first mounting flange may further comprise a through hole. The through hole may extend from the top side toward the bottom flange. At least a portion of the through hole may be disposed closer to the center plane than the first bottom flange side.

The intermediate flange may further comprise a first intermediate flange side. The first intermediate flange side may extend from the bottom flange. The first intermediate flange side may face away from the center plane. At least a portion of the through hole of the first mounting flange may be disposed closer to the center plane than the first intermediate flange side.

Another expression of the invention also relates to an axle beam. The axle comprises a beam and first and second kingpin mounting portions. The beam comprises a top side, a bottom side, a first side, a second side, and a bottom flange. The bottom side is disposed opposite the top side. The center plane extends from the top side to the bottom side. The first side extends from the top side toward the bottom side. The second side is disposed opposite the first side. The second side faces away from the center plane. The second side extends from the top side toward the bottom side. The bottom flange extends from the bottom side to the first side and the second side. The bottom flange protrudes farther from the center plane than the first side. The bottom flange protrudes farther from the center plane than the second side. The first and second kingpin mounting portions extend from opposite ends of the beam.

The second bottom flange side may extend from an end of the first bottom flange side to the first side. The second bottom flange side may be disposed at an oblique angle with respect to the first bottom flange side.

The beam may further comprise a first mounting flange. The first mounting flange may extend from the top side toward the bottom flange. The first mounting flange may protrude farther from the center plane than the first side. The first mounting flange may protrude farther from the center plane than the second side.

A passage may extend along a passage axis. The passage axis may extend along the center plane. The passage axis may extend through the first kingpin mounting portion. The passage axis may extend through the second kingpin mounting portion. The passage axis may extend through the beam. The passage may be positioned between the first side and the second side. The passage may be positioned along the center plane between the first mounting flange and the bottom flange.

The beam may further comprise a first pocket. The first pocket may protrude toward the center plane from the first side. The first pocket may extend from the first mounting flange toward the bottom flange.

The first mounting flange may further comprise a through hole. The through hole may extend from the top side toward the bottom flange. The first pocket may be partially defined by a first arcuate surface. The first arcuate surface may be radially disposed with respect to a first pocket axis. The first pocket axis may extend through the through hole in the first mounting flange.

The first mounting flange may be partially defined by a second arcuate surface. The second arcuate surface may extend from the first arcuate surface to the first side. The second arcuate surface may extend closer to the center plane as a distance from the bottom side and the first side increases.

The first pocket may further comprise a pocket height. The pocket height may extend in a direction parallel to the center plane. The passage may comprise a passage height. The passage height may extend along the center plane. The pocket height may be greater than the passage height.

The beam may further comprise a first mounting flange. The first mounting flange may extend from the top side toward the bottom flange. The first mounting flange may protrude farther from the center plane than the first side. The first mounting flange may protrude farther from the center plane than the second side. The first mounting flange may further comprise first and second through holes. The first and second through holes may extend from the top side toward the bottom side. The first mounting flange may further comprise a groove. The groove may extend from the top side toward the bottom side. The groove may extend from the first through hole to the second through hole.

BRIEF DESCRIPTION OF THE DRAWINGS

FIG. 1 is a perspective view of an example of an axle beam.

FIG. 2 is a side view of the axle beam of FIG. 1.

FIG. 6 is a perspective view of a second example of an axle beam.

FIG. 7 is a side view of the axle beam of FIG. 6.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Referring to FIGS. 1-5, an example of an axle beam 10 is shown. The axle beam 10 may be provided with a motor vehicle like a truck, bus, farm equipment, mining equipment, military transport or weaponry vehicle, or cargo loading equipment for land, air, or marine vessels. The axle beam 10 is configured to be mounted to a vehicle and may be part of a steering system that may be used to steer or change the direction of the vehicle.

The axle beam 10 is configured as a unitary one-piece component. For instance, the axle beam 10 may be a casting or cast component that is made of a metal alloy, such as steel or an aluminum alloy. The axle beam 10 includes a beam 20 and one or more kingpin mounting portions 22.

Figure 3:
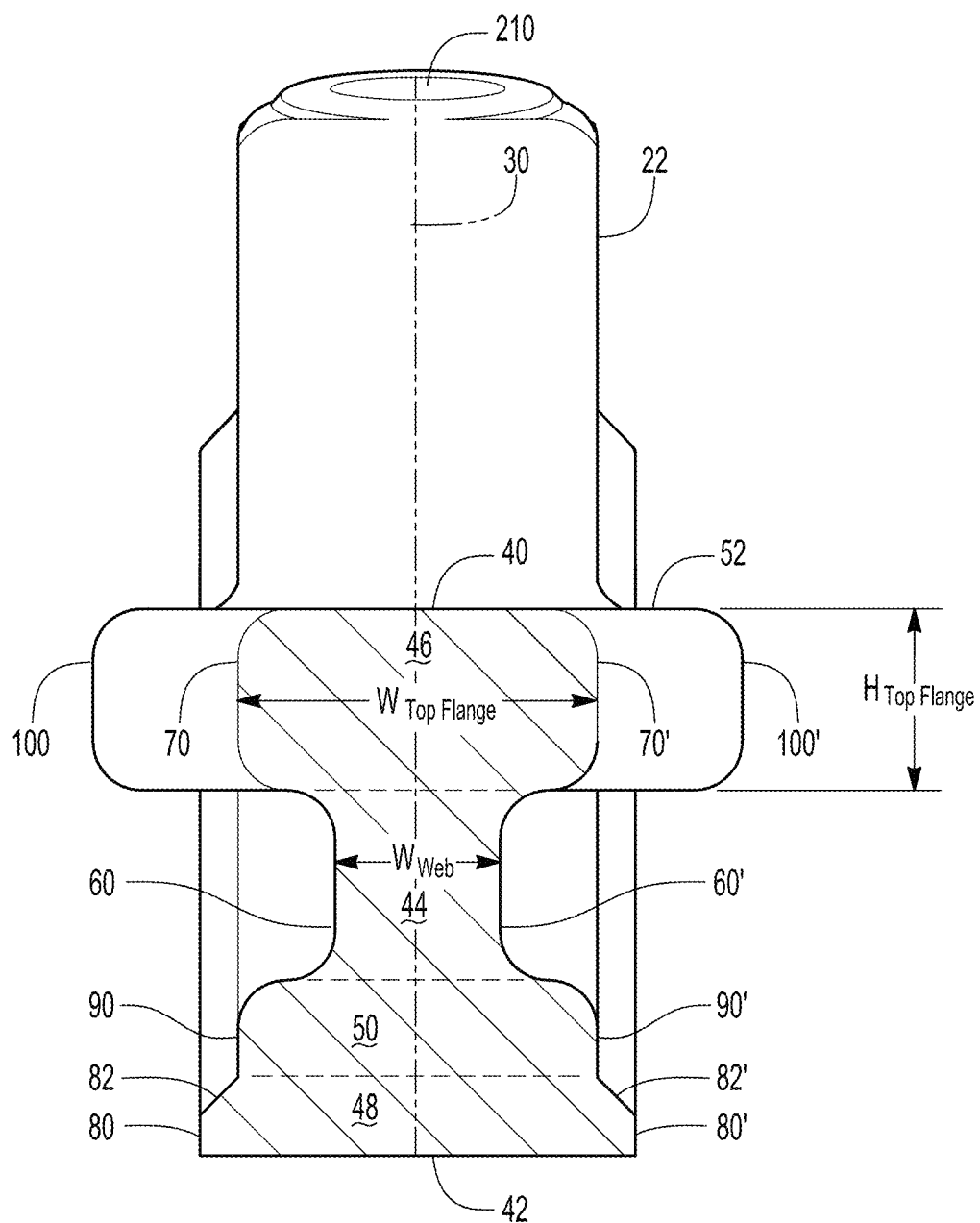
FIG. 3 is a section view along section line 3-3.
Figure 4:
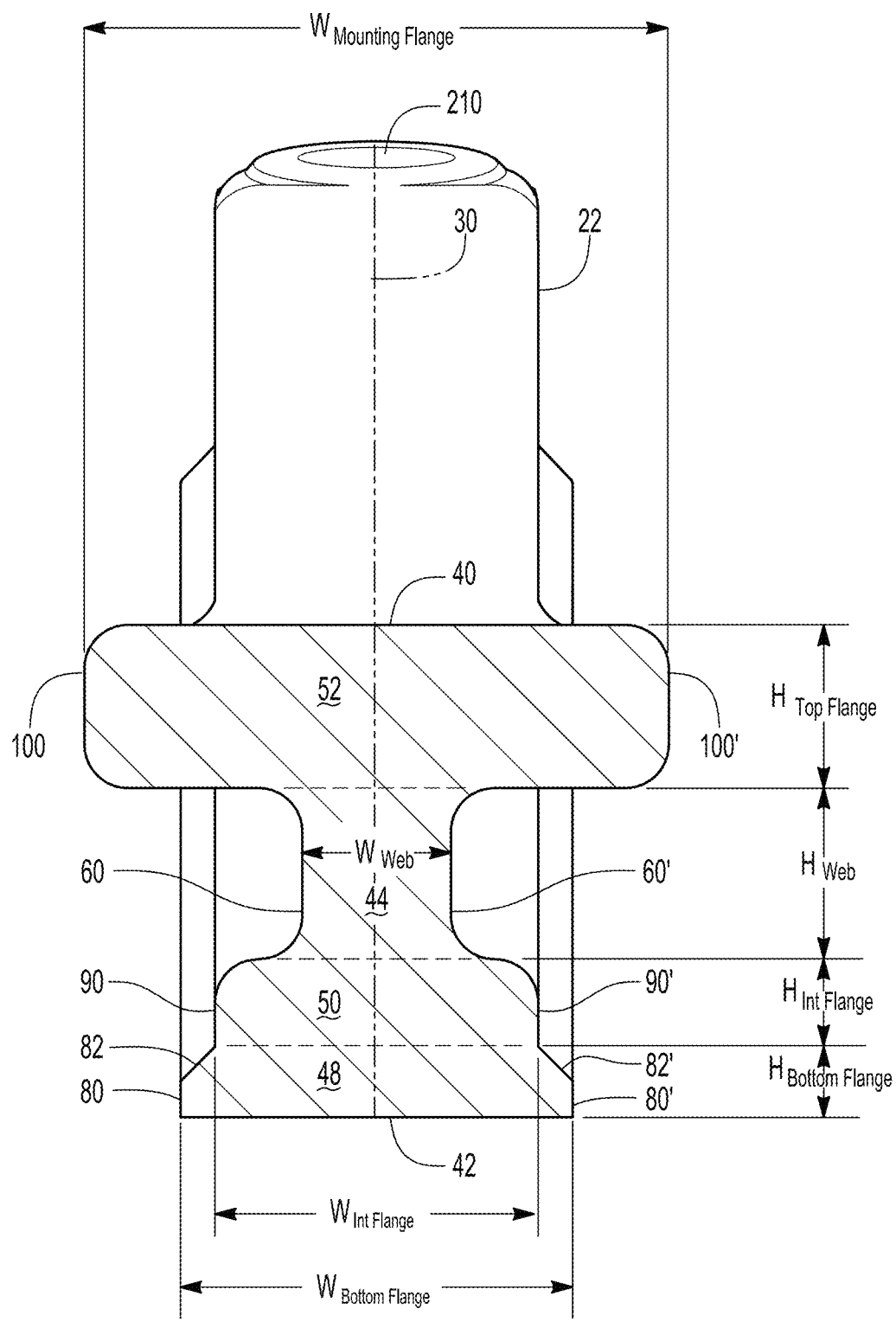
FIG. 4 is a section view along section line 4-4.
Figure 5:
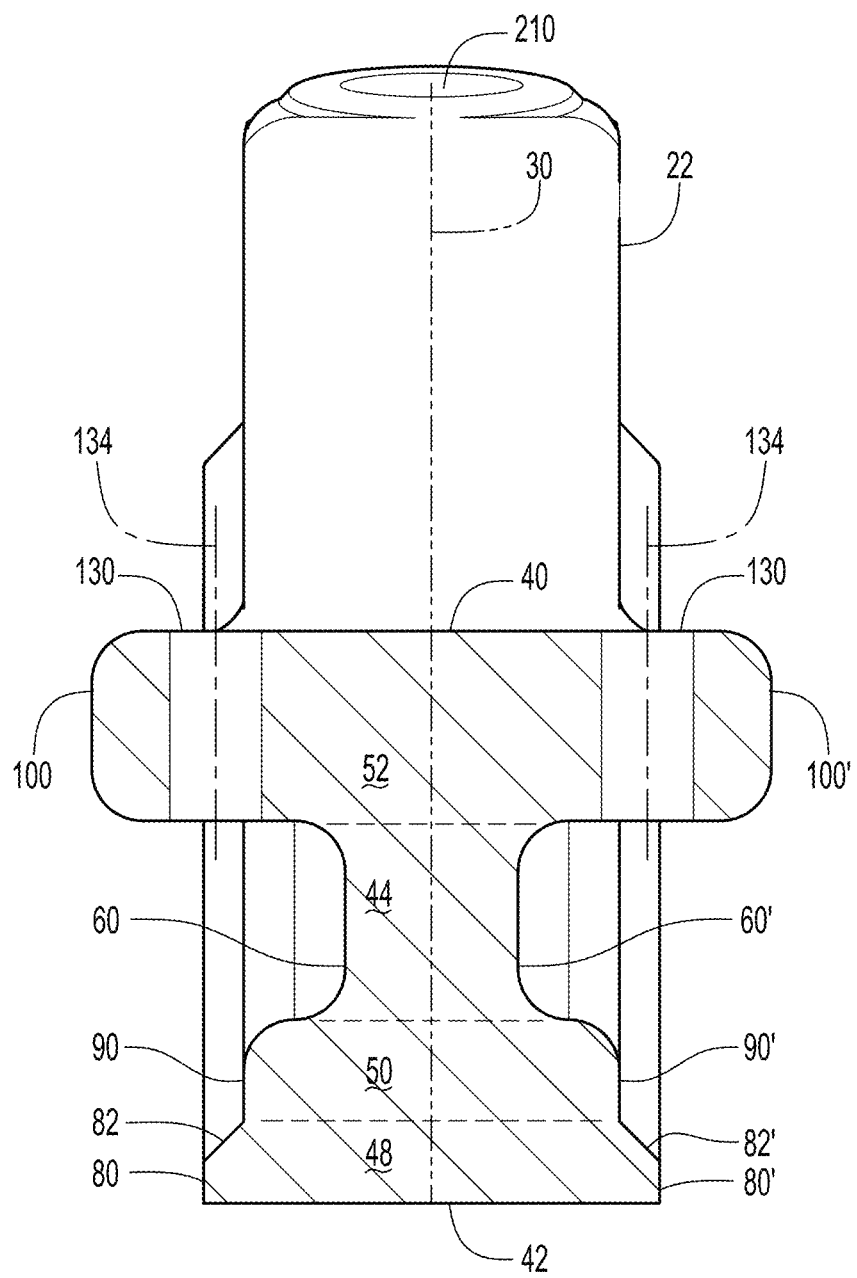
FIG. 5 is a section view along section line 5-5.

The beam 20 is disposed proximate the center of the axle beam 10. For instance, the first and second kingpin mounting portions 22, 22 may extend from opposite ends of the beam 20 and thus the beam 20 extends from a first kingpin mounting portion 22 to a second kingpin mounting portion 22. The beam 20 is configured to be mounted to the vehicle as will be discussed in more detail below. The beam 20 may extend in a generally linear manner from the first kingpin mounting portion 22 to the second kingpin mounting portion 22. In such a configuration, the beam 20 extends along a center plane 30, which is best shown with reference to FIGS. 3-5. The cross section or cross-sectional profile of the beam 20 perpendicular to the center plane 30 is not constant between the first kingpin mounting portion 22 and the second kingpin mounting portion 22 as is best shown in FIGS. 3-5. In some configurations, the beam 20 comprises a top side 40, a bottom side 42, a web 44, a top flange 46, a bottom flange 48, and an intermediate flange 50. The beam may also comprise one or more mounting flanges 52.

Referring primarily to FIG. 3, the top side 40 extends along the top of the beam 20 from the perspective shown. The top side 40 may face toward the chassis of a vehicle when the axle beam 10 is mounted to the vehicle. In some configurations, the top side 40 or a portion thereof may be flat or substantially planar. For instance, the top side 40 or a portion thereof may be disposed substantially perpendicular to the center plane 30. The term "substantially perpendicular" is used herein to designate features or axes that are the same as or very close to perpendicular and includes features that are within ±3° of being perpendicular each other. In some configurations, the top side 40 may extend from first kingpin mounting portion 22 to the second kingpin mounting portion 22.

The bottom side 42 is disposed opposite the top side 40. As such, the bottom side 42 may extend along the bottom of the beam 20 from the perspective shown. The bottom side 42 may face away from the chassis of a vehicle when the axle beam 10 is mounted to the vehicle. In some configurations, the bottom side 42 or a portion thereof may be flat or substantially planar. In some configurations, the top side 40 may be disposed substantially parallel to the bottom side 42. The term "substantially parallel" as used herein means the same as or very close to parallel and includes features or axes that are within ±3° of being parallel each other. In some configurations, the bottom side 42 may extend from first kingpin mounting portion 22 to the second kingpin mounting portion 22.

The center plane 30 extends from the top side 40 to the bottom side 42. In some configurations, the top side 40, the bottom side 42, or both may be disposed substantially perpendicular to the center plane 30. In some configurations, the center plane 30 may bisect the web 44, the top flange 46, the bottom flange 48, the intermediate flange 50, or combinations thereof. For instance, the beam 20 may have mirror symmetry with respect to the center plane 30 or symmetry on opposite sides of the center plane 30 at cross sections disposed perpendicular to the center plane 30.

The web 44 extends from the top flange 46 toward the bottom flange 48. The center plane 30 extends through the web 44. The web 44 may comprise a first web side 60 and a second web side 60' that is disposed opposite the first web side 60. The first web side 60 and the second web side 60' face away from the center plane 30. The first web side 60 and the second web side 60' are spaced apart from the center plane 30. In some configurations, the first web side 60 and the second web side 60' or a portion thereof are disposed substantially parallel to the center plane 30. The first web side 60 and the second web side 60' may extend from the top flange 46 to the intermediate flange 50. As is best shown in FIG. 4, the web 44 may have a web width $W_{Web}$ that extends from the first web side 60 to the second web side 60'. The web 44 may have a web height $H_{Web}$ that extends from the top flange 46 to the intermediate flange 50. In some configurations, the web height $H_{web}$ is greater than or equal to the web width $W_{Web}$.

Referring to FIG. 3, the top flange 46 extends from the top side 40 to the web 44. The center plane 30 extends through the top flange 46. The top flange 46 may comprise a first top flange side 70 and a second top flange side 70' that is disposed opposite the first top flange side 70. The first top flange side 70 and the second top flange side 70' face away from the center plane 30. The first top flange side 70 and the second top flange side 70' are spaced apart from the center plane 30. In some configurations, the first top flange side 70 and the second top flange side 70' or a portion thereof are disposed substantially parallel to the center plane 30. The first top flange side 70 and the second top flange side 70' may extend from the top side 40 toward the bottom side 42.

The top flange 46 may protrude farther from the center plane 30 than the web 44. For instance, the top flange 46 may have a top flange width $W_{TopFlange}$ that extends from the first top flange side 70 to the second top flange side 70'. The top flange width $W_{TopFlange}$ is greater than the web width $W_{Web}$.

The top flange 46 may have a top flange height $H_{TopFlange}$ that extends from the top side 40 to the web 44. The top flange height $H_{TopFlange}$ may extend along the center plane 30 or parallel to the center plane 30. In some configurations, the top flange height $H_{TopFlange}$ is less than the top flange width $W_{TopFlange}$.

Referring primarily to FIG. 4, the bottom flange 48 extends from the bottom side 42 toward the web 44. In some configurations, the bottom flange 48 extends from the bottom side 42 to the intermediate flange 50. The center plane 30 extends through the bottom flange 48. The bottom flange 48 may comprise a first bottom flange side 80, a second bottom flange side 80', a first bottom flange connecting side 82, and a second bottom flange connecting side 82'.

The first bottom flange side 80 is disposed opposite the second bottom flange side 80'. The first bottom flange side 80 and the second bottom flange side 80' face away from the center plane 30. The first bottom flange side 80 and the second bottom flange side 80' are spaced apart from the center plane 30. In some configurations, the first bottom flange side 80 and the second bottom flange side 80' are disposed substantially parallel to the center plane 30. The first bottom flange side 80 may extend from the bottom side 42 to the first bottom flange connecting side 82. The second bottom flange side 80' may extend from the bottom side 42 to the second bottom flange connecting side 82'.

The first bottom flange connecting side 82 is disposed opposite the second bottom flange connecting side 82'. The first bottom flange connecting side 82 and the second bottom flange connecting side 82' face away from the center plane 30. The first bottom flange connecting side 82 and the second bottom flange connecting side 82' are spaced apart from the center plane 30. The first bottom flange connecting side 82 and the second bottom flange connecting side 82' may be disposed at an oblique angle with respect to the center plane 30. In some configurations, the first bottom flange connecting side 82 extends from an end of the first bottom flange side 80 to the intermediate flange 50 and extends at an oblique angle with respect to the first bottom flange side 80. In some configurations, the second bottom flange connecting side 82' extends from an end of the second bottom flange side 80' to the intermediate flange 50 and extends at an oblique angle with respect to the second bottom flange side 80'. The first bottom flange connecting side 82 and the second bottom flange connecting side 82' may extend closer together as the distance from the bottom side 42 increases.

The bottom flange 48 may protrude farther from the center plane 30 than the web 44. For instance, the bottom flange 48 may have a bottom flange width $W_{BottomFlange}$ that extends from the first bottom flange side 80 to the second bottom flange side 80'. The bottom flange width $W_{BottomFlange}$ is greater than the web width $W_{Web}$. In some configurations, the bottom flange 48 may protrude farther from the center plane 30 than the top flange 46. For instance, the bottom flange width $W_{BottomFlange}$ may be greater than the top flange width $W_{TopFlange}$, which is best shown in FIG. 3.

Referring to FIG. 4, the bottom flange 48 may have a bottom flange height $H_{BottomFlange}$ that extends from the bottom side 42 to the intermediate flange 50. The bottom flange height $H_{BottomFlange}$ may extend along the center plane 30 or parallel to the center plane 30. In some configurations, the bottom flange height $H_{BottomFlange}$ is less than the bottom flange width $W_{BottomFlange}$. The top flange height $H_{TopFlange}$ may be greater than the bottom flange height $H_{BottomFlange}$. The bottom flange 48 may protrude farther from the center plane 30 than the intermediate flange 50.

The intermediate flange 50 extends from the bottom flange 48 to the web 44. The center plane 30 extends through the intermediate flange 50. The intermediate flange 50 may comprise a first intermediate flange side 90 and a second intermediate flange side 90' that is disposed opposite the first intermediate flange side 90. The first intermediate flange side 90 and the second intermediate flange side 90' face away from the center plane 30. The first intermediate flange side 90 and the second intermediate flange side 90' are spaced apart from the center plane 30. In some configurations, the first intermediate flange side 90 and the second intermediate flange side 90' are disposed substantially parallel to the center plane 30. The first intermediate flange side 90 may extend from the first bottom flange connecting side 82 toward the top side 40. The second intermediate flange side 90' may extend from the second bottom flange connecting side 82' toward the top side 40.

The intermediate flange 50 may protrude farther from the center plane 30 than the web 44. For instance, the intermediate flange 50 may have an intermediate flange width $W_{IntFlange}$ that extends from the first intermediate flange side 90 to the second intermediate flange side 90'. The intermediate flange width $W_{IntFlange}$ is greater than the web width $W_{Web}$. The bottom flange 48 may protrude farther from the center plane 30 than the intermediate flange 50. For instance, the intermediate flange width $W_{IntFlange}$ is less than the bottom flange width $W_{BottomFlange}$.

The intermediate flange 50 may have an intermediate flange height $H_{IntFlange}$ that extends from the bottom flange 48 to the web 44. The intermediate flange height $H_{IntFlange}$ may extend along the center plane 30 or parallel to the center plane 30. In some configurations, the intermediate flange height $H_{IntFlange}$ is less than the intermediate flange width W IntFlange. The top flange height $H_{TopFlange}$ may be greater than the intermediate flange height $H_{IntFlange}$.

Referring primarily to FIGS. 1, 4, and 5, one or more mounting flanges 52 may be provided with the beam 20. In the configuration shown in FIG. 1, two mounting flanges 52, 52 are shown. For convenience in reference, the mounting flanges may be referred to as a first mounting flange 52 and a second mounting flange 52. In some configurations, a mounting flange 52 may extend from an adjacent kingpin mounting portion 22. For instance, the first mounting flange 52 may extend from the first kingpin mounting portion 22 and the second mounting flange 52 may extend from the second kingpin mounting portion 22.

As is best shown in FIG. 1, the first mounting flange 52 may be spaced apart from the second mounting flange 52. The top flange 46 may extend between the first mounting flange 52 and the second mounting flange 52. For instance, the top flange 46 may extend from the first mounting flange 52 to the second mounting flange 52. In some configurations, the top side 40 partially defines the mounting flange 52. For instance, the mounting flange 52 may be coextensive or coplanar with the top side 40 of the beam 20.

Referring primarily to FIGS. 4 and 5, the mounting flange 52 extends from the top side 40 to the web 44. The center plane 30 extends through the mounting flange 52. The mounting flange 52 may comprise a first mounting flange side 100 and a second mounting flange side 100' that is disposed opposite the first mounting flange side 100. The first mounting flange side 100 and the second mounting flange side 100' face away from the center plane 30. The first mounting flange side 100 and the second mounting flange side 100' are spaced apart from the center plane 30. In some configurations, the first mounting flange side 100 and the second mounting flange side 100' are disposed substantially parallel to the center plane 30. The first mounting flange side 100 and the second mounting flange side 100' may extend from the top side 40 toward the bottom side 42.

Referring primarily to FIG. 4, the mounting flange 52 may protrude farther from the center plane 30 than the web 44, the top flange 46, the bottom flange 48, the intermediate flange 50, or combinations thereof. For instance, the mounting flange 52 may have a mounting flange width $W_{MountingFlange}$ that extends from the first mounting flange side 100 to the second mounting flange side 100'. In the configuration shown, mounting flange width $W_{MountingFlange}$ is greater than the top flange width $W_{TopFlange}$ (which is best shown in FIG. 3), the bottom flange width $W_{BottomFlange}$, the web width $W_{Web}$, and the intermediate flange width $W_{IntFlange}$.

Referring primarily to FIG. 1, connecting surfaces may extend from each mounting flange side. For instance, a connecting surface 110 may extend from the first mounting flange side 100 to the first top flange side 70 and another connecting surface 112 may extend from an opposite end of the first mounting flange side 100 to the first kingpin mounting portion 22. Similarly, a connecting surface 110' may extend from the second mounting flange side 100' to the second top flange side 70' and another connecting surface 112' may extend from an opposite end of the second mounting flange side 100' to the second kingpin mounting portion 22. In some configurations, one or more of the connecting surfaces 110, 110', 112, 112' may extend along and arc. One or more of the connecting surfaces 110, 110', 112, 112' may or may not be disposed substantially parallel to the center plane 30.

Figure 12:
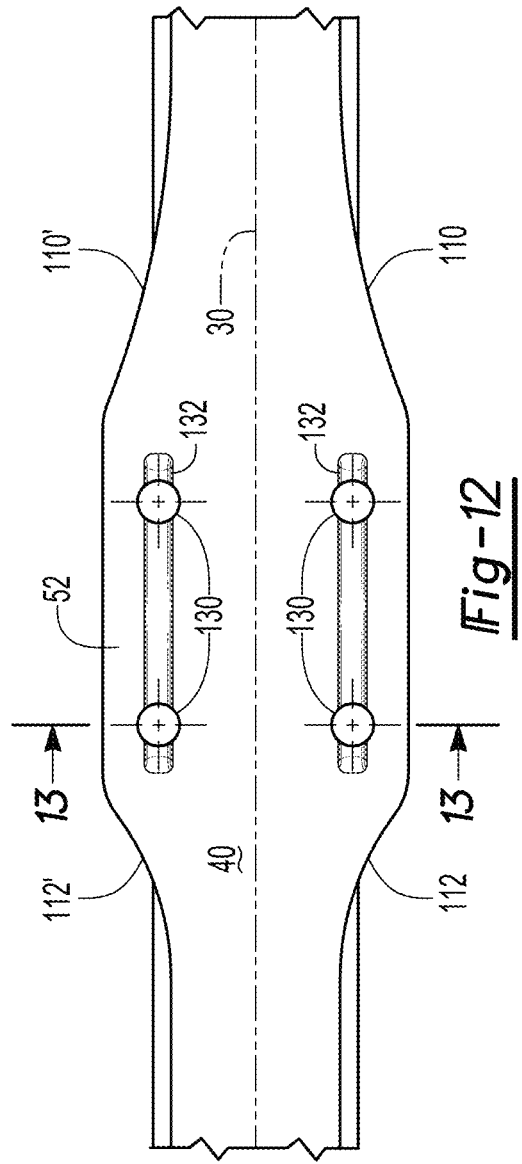
FIG. 12 is a top view of an example of a mounting flange that may be provided with an axle beam.

As is best shown in FIGS. 1 and 5, a mounting flange 52 may comprise one or more through holes 130. A mounting flange 52 may optionally comprise one or more grooves 132 as shown in FIG. 12.

One or more through holes 130 may extend through the mounting flange 52. In the configuration shown, four through holes 130 are provided with each mounting flange 52; however, it is contemplated that a greater or lesser number of through holes 130 may be provided. The through holes 130 are spaced apart from each other. A through hole 130 may be configured to receive a fastener, such as a bolt, that facilitates coupling of the axle beam 10 directly or indirectly to a vehicle chassis. For instance, a suspension system component, such as a leaf spring, air spring, or the like, may be disposed on the top side of the mounting flange 52 and may be secured to the mounting flange 52 with one or more fasteners, such as bolts, that extend through the through hole 130. The suspension system component may be secured to the vehicle chassis at a different location, thereby coupling the axle beam 10 to the chassis.

As is best shown in FIG. 5, a through hole 130 may extend along a through hole axis 134. In some configurations, a through hole axis 134 may be disposed substantially parallel to the center plane 30.

In some configurations, at least a portion of the through hole 130 may be disposed closer to the center plane 30 than various flange sides. For convenience in reference, the through hole 130 that is disposed to the left of the center plane 30 from the perspective shown in FIG. 5 may be referred to as a first through hole 130 and the through hole 130 that is disposed to the right of the center plane 30 from the perspective shown may be referred to as a second through hole 130. At least a portion of the first through hole 130 may be disposed closer to the center plane 30 than the first top flange side 70 (which is best shown in FIG. 3), the first bottom flange side 80, the first bottom flange connecting side 82, the first intermediate flange side 90, or combinations thereof. At least a portion of the second through hole 130 may be disposed closer to the center plane 30 than the second top flange side 70' (which is best shown in FIG. 3), the second bottom flange side 80', the second bottom flange connecting side 82', the second intermediate flange side 90', or combinations thereof.

Referring to FIGS. 6-11, another configuration of an axle beam 10' is shown. This configuration is similar to the axle beam 10 previously described but omits the top flange and intermediate flange. The axle beam 10' may include a passage 140, one or more pockets 142, or both.

Figure 8:
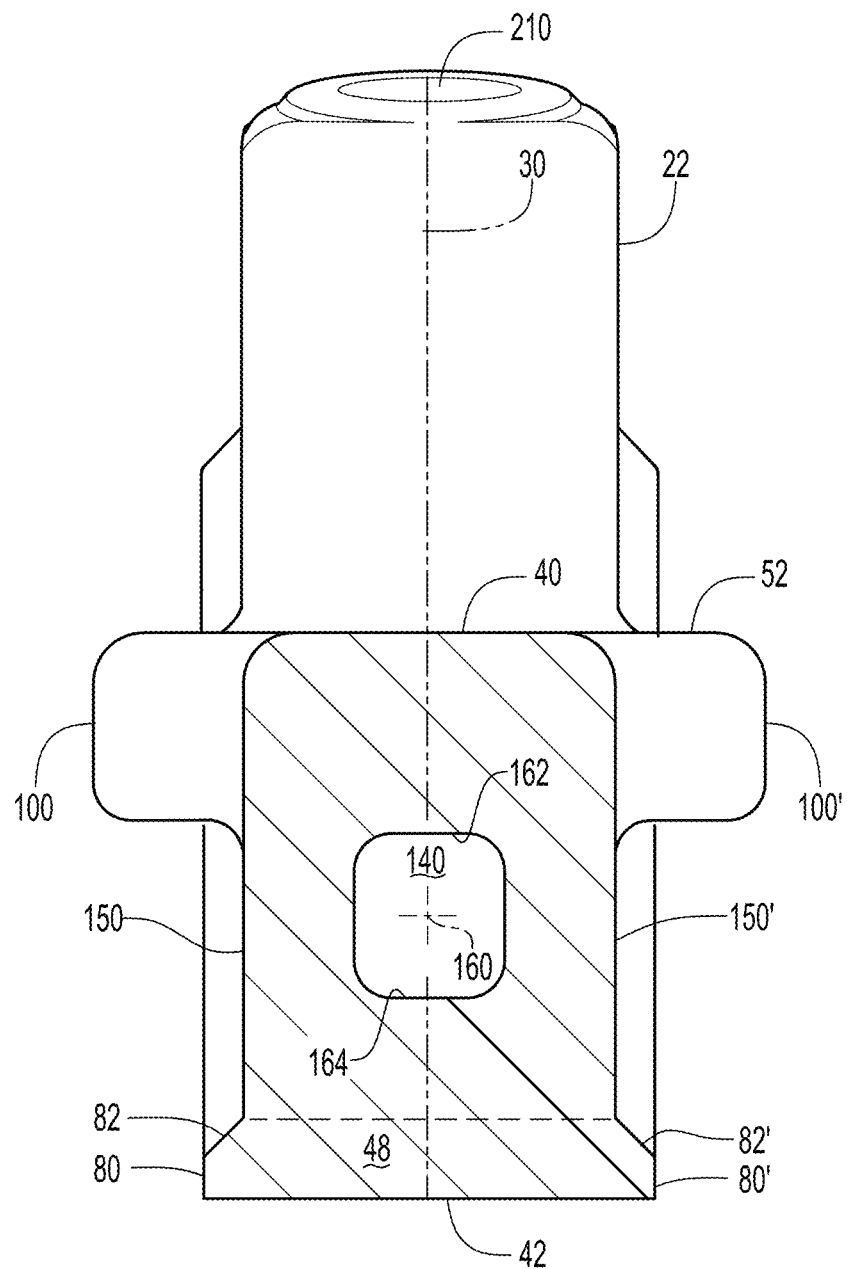
FIG. 8 is a section view along section line 8-8.

Referring primarily to FIGS. 6 and 8, the beam 20' comprises a top side 40, a bottom side 42, a bottom flange 48, and one or more mounting flanges 52. The beam 20' also includes a first side 150 and a second side 150', which are best shown in FIG. 8.

Referring primarily to FIG. 8, the first side 150 faces away from the center plane 30. In addition, the first side 150 is spaced apart from the center plane 30. The first side 150 may extend from the top side 40 to or toward the bottom flange 48. For instance, the first side 150 may extend from the top side 40 to the first bottom flange connecting side 82.

The second side 150' is disposed opposite the first side 150. The second side 150' faces away from the center plane 30 and may be spaced apart from the center plane 30. The second side 150' may extend from the top side 40 to or toward to the bottom flange 48. For instance, the second side 150' may extend from the top side 40 to the second bottom flange connecting side 82'. In some configurations, the first side 150 is disposed substantially parallel to the second side 150', the center plane 30, or combinations thereof.

Figure 10:
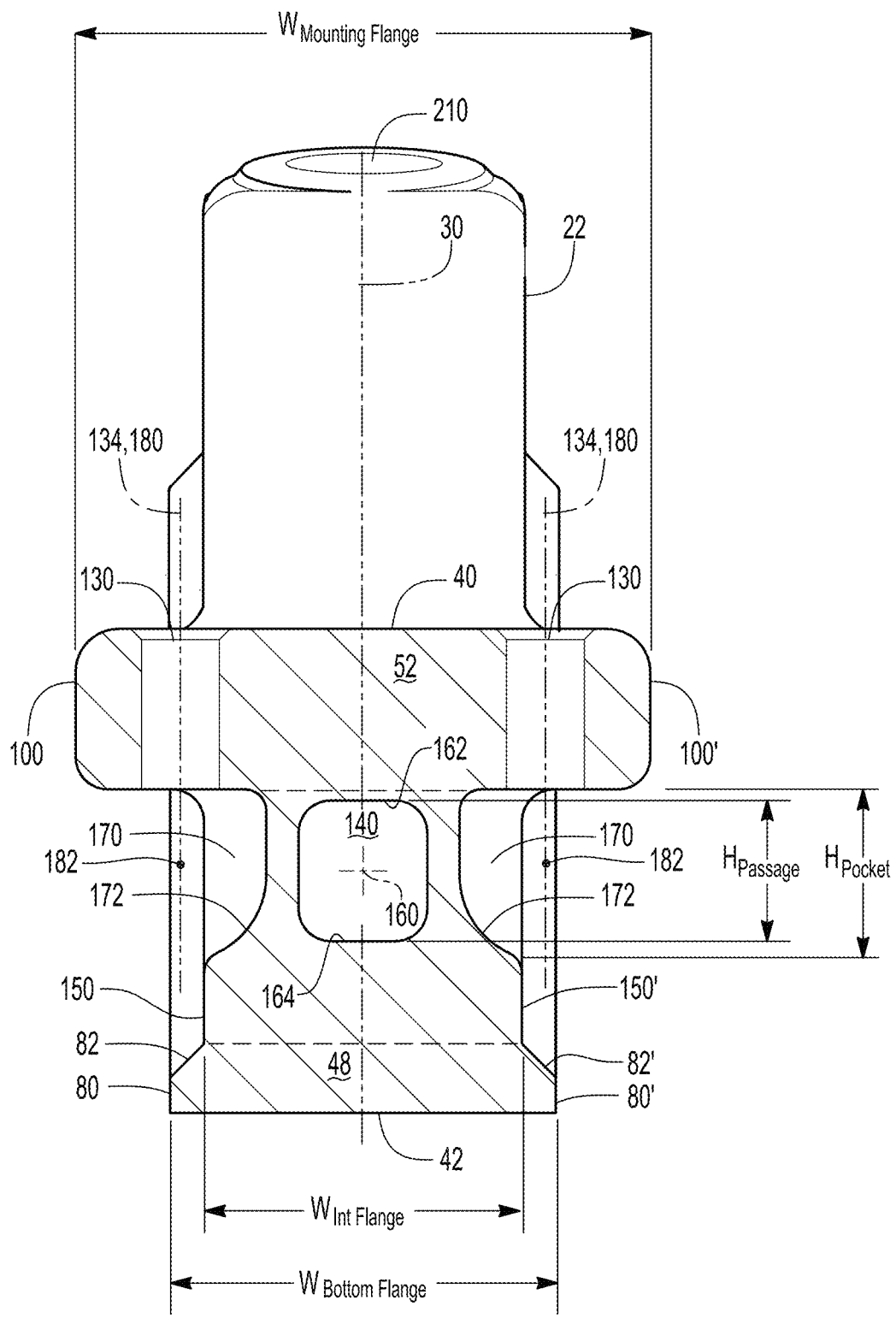
FIG. 10 is a section view along section line 10-10.

Referring to FIG. 10, the bottom flange 48 may protrude farther from the center plane 30 than the first side 150, the second side 150', or both. For instance, the bottom flange width $W_{BottomFlange}$ is greater than the width W from the first side 150 to the second side 150'.

A mounting flange 52 may extend farther from the center plane 30 than the first side 150 and the second side 150'. For instance, the mounting flange width $W_{MountingFlange}$ may be greater than the width W from the first side 150 to the second side 150'.

Referring primarily to FIGS. 8-11, the passage 140 is a through hole that extends through the axle beam. The passage 140 may help reduce the weight of the axle beam, provide localized stiffening, facilitate drainage, facilitate cooling during manufacturing, or combinations thereof. It is contemplated that the passage 140 could also be provided in the configuration shown in FIGS. 1-5.

Figure 9:
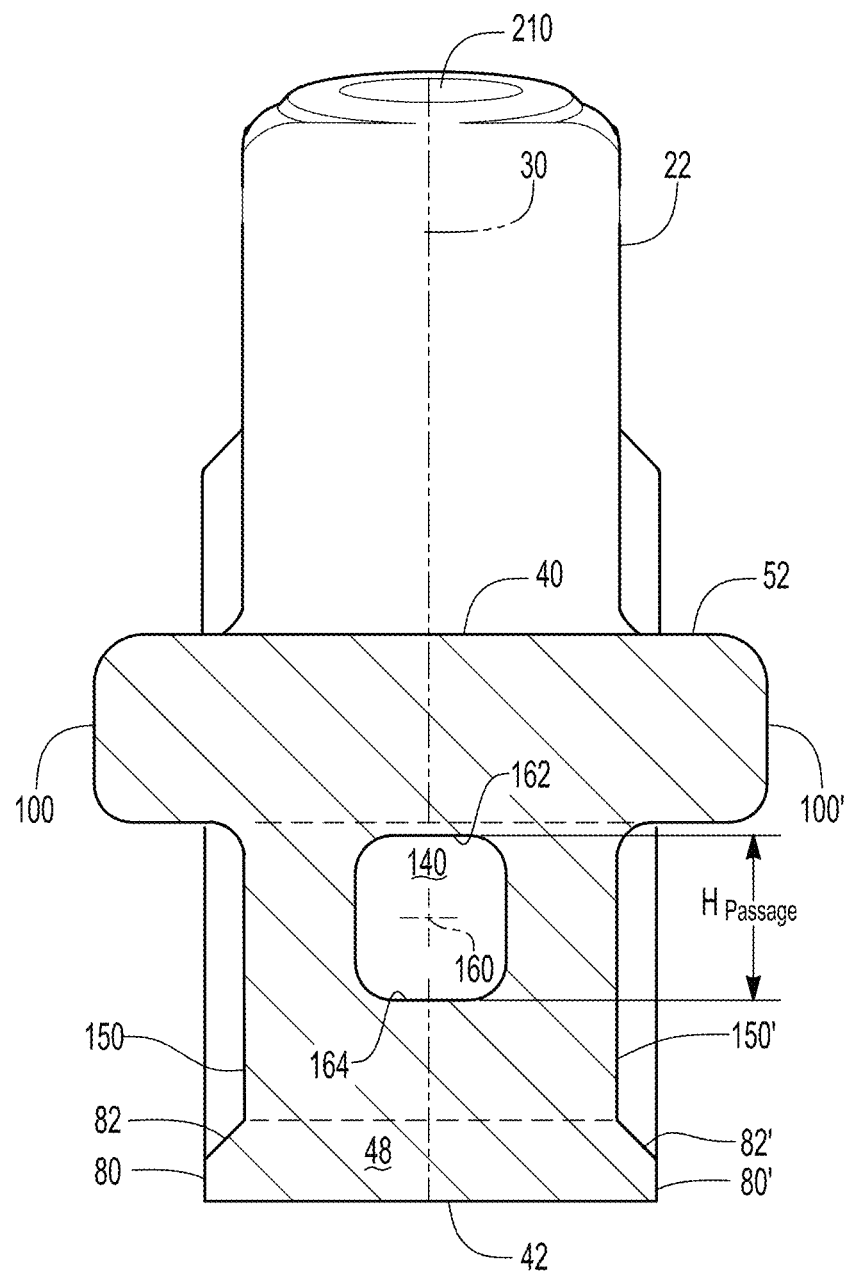
FIG. 9 is a section view along section line 9-9.
Figure 11:
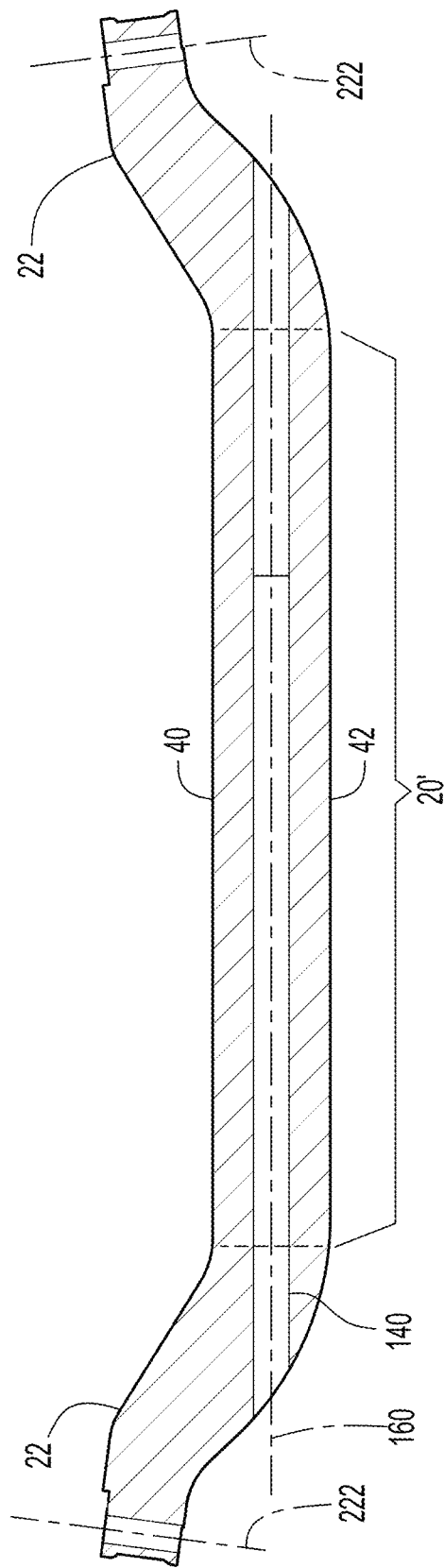
FIG. 11 is a section view along section line 11-11.

The passage 140 may extend along a passage axis 160. The passage axis 160 may extend along the center plane 30. For instance, the passage axis 160 may be completely disposed in the center plane 30. As is best shown in FIG. 11, the passage 140 and the passage axis 160 may extend through the first kingpin mounting portion 22, the beam 20', and the second kingpin mounting portion 22. As is best shown in FIGS. 8-10, the passage 140 may be positioned between and may be spaced apart from the first side 150 and the second side 150'. The passage 140 may be positioned vertically or along the center plane 30 between the top side 40 and the bottom flange 48. In some configurations, the passage 140 is disposed below the mounting flange 52 or closer to the bottom side 42 than the mounting flange 52, above the bottom flange 48 or closer to the top side 40 than the bottom flange 48, or both.

The passage 140 may have a passage height $H_{Passage}$. The passage height $H_{Passage}$ may be a height of the passage 140 along the center plane 30 or in a direction that extends parallel to the center plane 30. For instance, the passage height $H_{Passage}$ may extend from a top passage side 162 to a bottom passage side 164 of the passage 140. In some configurations, the top passage side 162 is disposed closer to the bottom side 42 than the mounting flange 52 while the bottom passage side 164 is disposed closer to the top side 40 than the bottom flange 48.

Referring primarily to FIGS. 6 and 10, one or more pockets 142 may be provided with the beam 20'. A pocket 142 is configured to provide clearance between the beam 20' and a fastener for instance, a pocket 142 may provide clearance between a side of the beam 20' and fastener that extends through a through hole 130 in the mounting flange 52, nut that is disposed on the fastener, a washer that is disposed on the fastener, or combinations thereof. A pocket 142 may extend from the mounting flange 52 toward the bottom side 42. In the configuration shown, a pocket 142 is associated with and aligned with each through hole 130 in the mounting flange 52.

Referring primarily to FIG. 10, a pocket 142 may extend toward the center plane 30 from a side of the beam 20'. For instance, a pocket 142 that is disposed to the left of the center plane 30 from the perspective shown in FIG. 10 may extend from the first side 150 toward the center plane 30. Similarly, a pocket 142 that is disposed to the right of the center plane 30 from the perspective shown in FIG. 10 may extend from the second side 150' toward the center plane 30.

A pocket 142 may extend vertically from the mounting flange 52 toward the bottom flange 48. For instance, a pocket 142 may extend from a lower side of the mounting flange 52 that is disposed opposite the top side 40 toward the bottom side 42 and the bottom flange 48. In some configurations, the pocket 142 is partially defined by a first arcuate surface 170 and a second arcuate surface 172.

The first arcuate surface 170 extend from a side toward the center plane 30. For instance, the first arcuate surface 170 of a pocket 142 that extends from the first side 150 toward the center plane 30 and may extend along an arc that may intersect the first side 150 at two locations. In some configurations, the first arcuate surface 170 may be radially disposed with respect to an axis, such as a pocket axis 180. A pocket axis 180 may extend through an adjacent through hole 130 in the mounting flange 52. The pocket axis 180 may be disposed substantially parallel to the center plane 30. In some configurations, the pocket axis 180 may be coaxially disposed with the through hole axis 134 of an adjacent through hole 130. The first arcuate surface 170 extends vertically from the mounting flange 52 to the second arcuate surface 172.

The second arcuate surface 172 may extend from the first arcuate surface 170 toward the bottom side 42. In some configurations, the second arcuate surface 172 may extend along an arc that extends away from the center plane 30 as the second arcuate surface 172 extends toward the bottom side 42. Said differently, the second arcuate surface 172 may extend closer to the center plane 30 as the distance from the bottom side 42 increases and as the distance from an associated side, such as the first side 150 or the second side 150' increases. For instance, the second arcuate surface 172 may be a part-spherical surface that may be radially disposed with respect to a point 182 that is disposed along the pocket axis 180.

The pocket 142 may have a pocket height $H_{Pocket}$. The pocket height $H_{Pocket}$ may extend along the pocket axis 180 or extend in a direction that extends parallel or substantially parallel to the center plane 30. The pocket height $H_{Pocket}$ may be greater than the passage height $H_{Passage}$.

Figure 13:
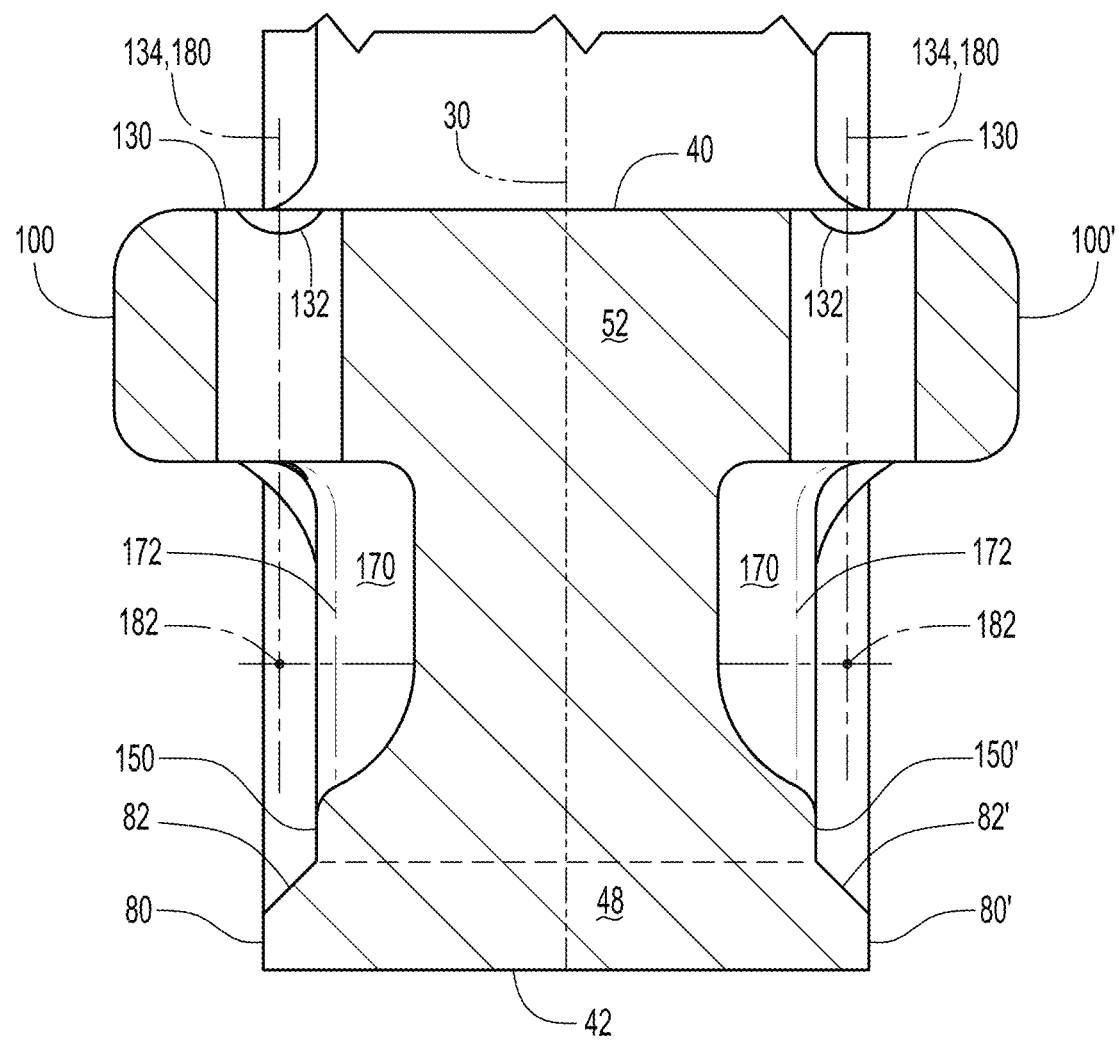
FIG. 13 is a section view along section line 13-13.
Figure 14:
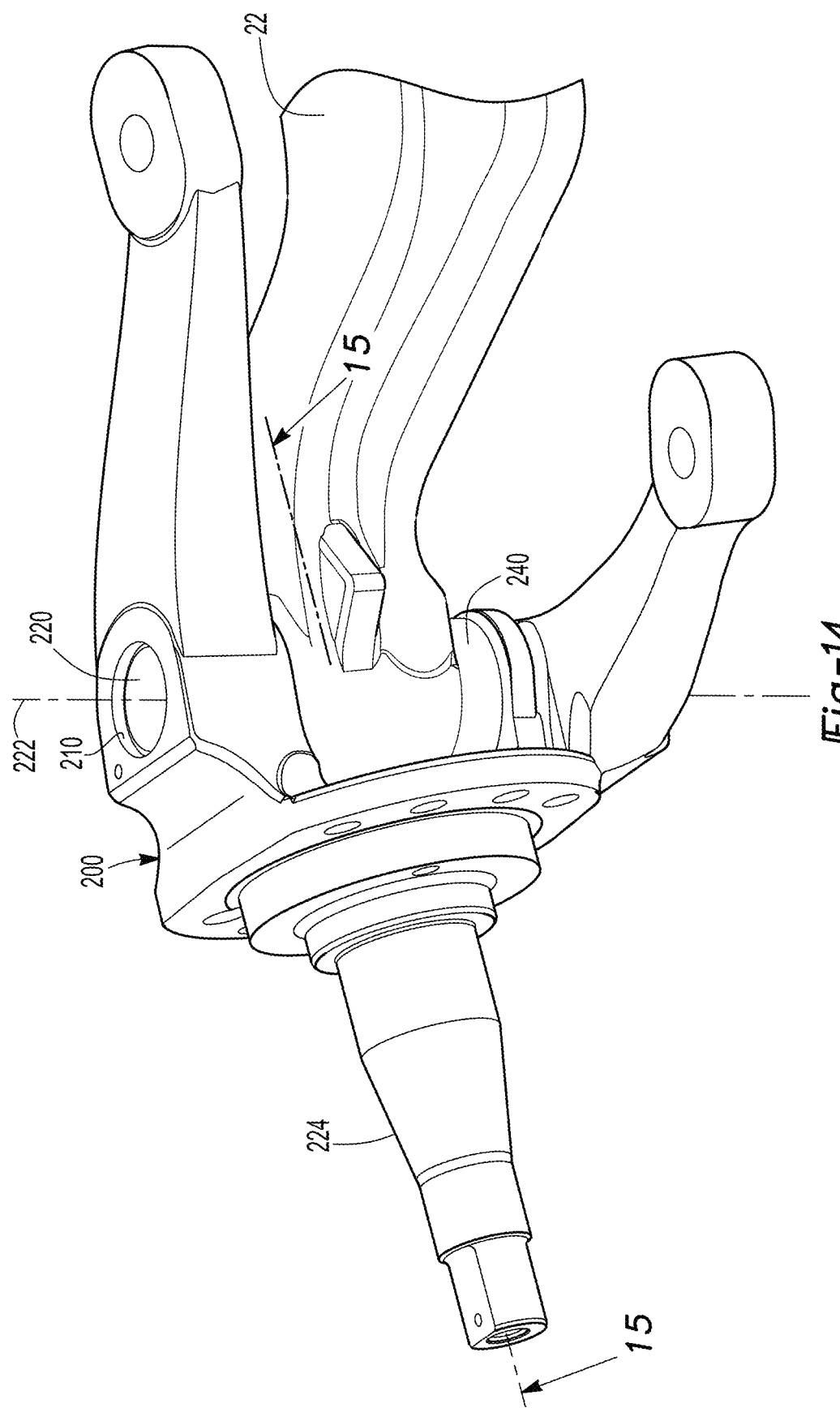
FIG. 14 is a perspective view of an example of a steering knuckle mounted to an axle beam.

Referring to FIGS. 12 and 13, the mounting flange 52 of any configuration previously discussed may optionally include a groove 132. A groove 132 may facilitate alignment and retention of a suspension system component that is disposed on or fastened to the mounting flange 52, may help reduce weight of the mounting flange 52, may provide localized stiffening of the mounting flange 52 or combinations thereof. The groove 132 may extend from the top side 40 toward the bottom side 42 but may not be a through hole that extends completely through the mounting flange 52 like the through holes 130. As is best shown in FIG. 12, the groove 132 may extend from one through hole 130 to another through hole 130. In some configurations, the groove 132 may extend past one or more through holes. In FIG. 12, the groove 132 extends past both through holes 130, 130 and thus a portion of the groove 132 is disposed to the left of the leftmost through holes 130 and to the right of the rightmost through holes 130 from the perspective shown. In some configurations, the groove 132 may be disposed substantially parallel to the center plane 30. In some configurations, the diameter of the through hole is greater than the width of the groove 132, which may help maintain strength of the mounting flange 52.

Referring primarily to FIGS. 1 and 6, a kingpin mounting portion 22 may be disposed at an end of the beam 20. For instance, a kingpin mounting portion 22 may be disposed at each end or opposite ends of the beam 20. The kingpin mounting portion 22 may be integrally formed with the beam 20. The kingpin mounting portion 22 may be offset from the beam 20 and may have a "gooseneck" configuration in which the kingpin mounting portion 22 extends further upward from the beam 20 (e.g., extends above the top side 40) as the distance from the beam 20 increases.

Figure 15:
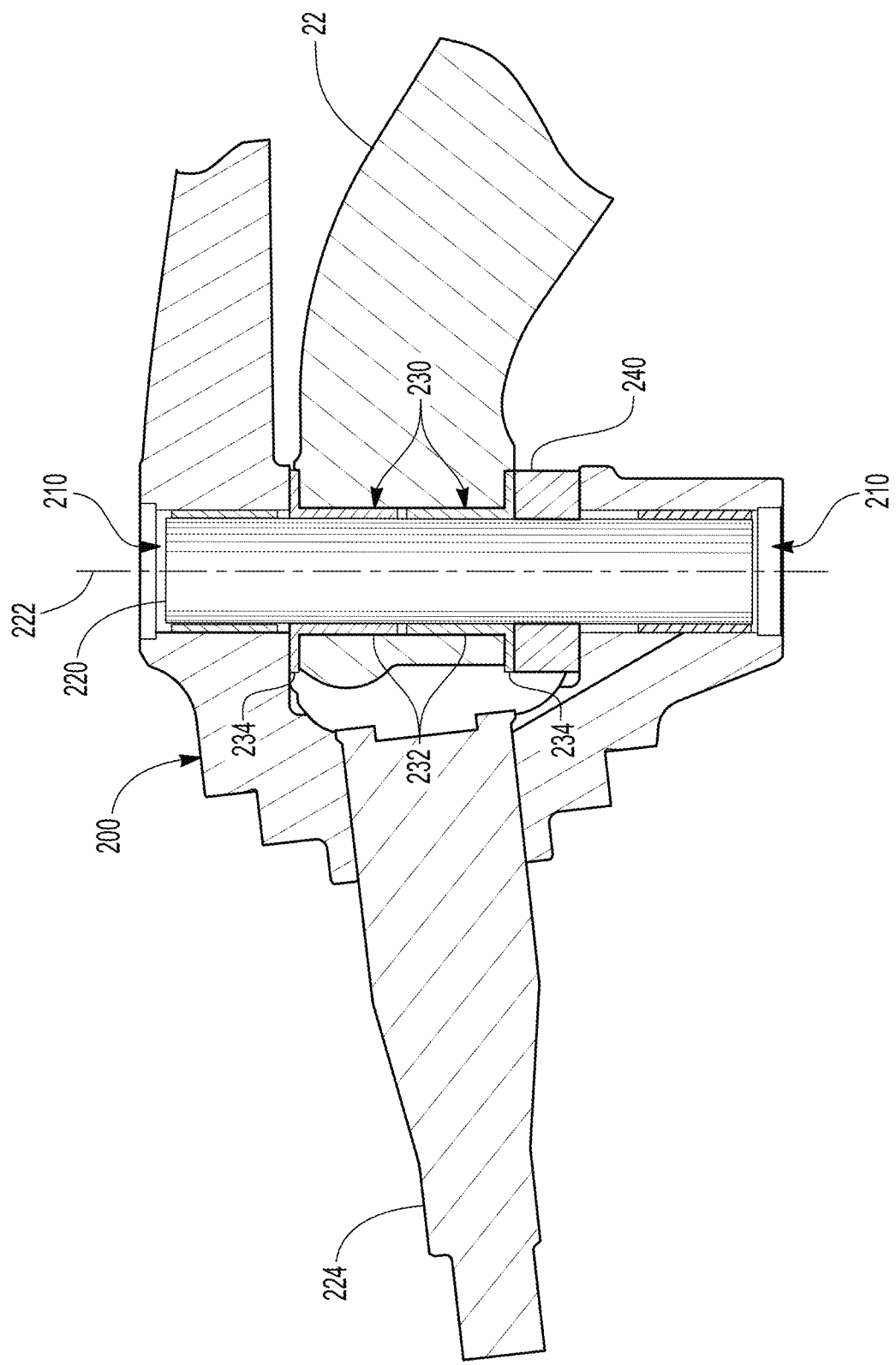
FIG. 15 is a section view along section line 15-15.

Referring to FIG. 15, the kingpin mounting portion 22 is configured to rotatably support a steering knuckle 200. In some configurations, the kingpin mounting portion 22 comprises a kingpin hole 210. The kingpin hole 210 is configured to receive a kingpin 220 that couples the steering knuckle 200 to the axle beam 10 such that the steering knuckle 200 is configured to pivot or rotate about the kingpin 220 with respect to the axle beam 10. For instance, the steering knuckle 200 may be pivotable or rotatable about a kingpin axis 222 along which the kingpin 220 may extend. The steering knuckle 200 may have a spindle 224 that may support one or more wheel bearings that in turn may support and facilitate rotation of a wheel hub and a vehicle wheel.

In some configurations and as is best shown in FIG. 15, one or more sleeves 230 may be disposed between the kingpin 220 and the kingpin mounting portion 22. In the configuration shown in FIG. 15, two sleeves 230 are illustrated in which one sleeve 230 is inserted into an upper end of the kingpin hole 210 and the other sleeve 230 is inserted into a lower end of the kingpin hole 210 that is disposed opposite the upper end. A sleeve 230 may be provided when there are strength or hardness differences between the kingpin mounting portion 22 and the kingpin 220. For instance, a sleeve 230 may be employed when the kingpin mounting portion 22 is made of a softer material than the kingpin 220, such as when the kingpin mounting portion 22 is made of an aluminum alloy and the kingpin 220 is made of steel. In some configurations, the sleeve 230 may be made of steel and may be hardened. In some configurations, a sleeve 230 may include a tubular portion 232 and a flange 234.

The tubular portion 232 may be received in the kingpin hole 210. The tubular portion 232 may encircle the kingpin 220 and may extend from the exterior side of the kingpin 220 to a surface of the kingpin mounting portion 22 that defines the kingpin hole 210.

The flange 234 may extend from an end of the tubular portion 232 in a direction that extends away from the kingpin 220. The flange 234 may engage or contact an adjacent exterior side of the kingpin mounting portion 22, thereby limiting the depth that the tubular portion 232 can be inserted into the kingpin hole 210. The flange 234 may also act as a spacer. For instance, the flange 234 of the topmost sleeve from the perspective shown in FIG. 15 or upper sleeve 230 may separate the kingpin mounting portion 22 from an upper arm of the steering knuckle 200 while the flange 234 of the bottommost sleeve from the perspective shown in FIG. 15 or lower sleeve 230 may separate the kingpin mounting portion 22 from a lower arm of the steering knuckle 200 or a bearing 240, such as a thrust bearing, that may rotatably support the steering knuckle 200.

An axle beam as described above may allow an axle beam to be manufactured with reduced weight, reduced cost, or both. Reduced weight may help reduce the weight of a vehicle and may help improve fuel economy or reduce energy consumption used to propel the vehicle. Weight reduction may be associated with the material used to make the axle beam or features of the axle beam, such as pockets, passages, grooves, or combinations thereof. An axle beam may be provided with flanges of different widths rather than an I-beam configuration or configuration having substantially identical top and bottom flanges, which may help reduce weight, provide localized stiffening or torsional resistance, or combinations thereof. Providing an axle beam as a casting may eliminate assembly steps as compared to an axle beam that is assembled from multiple parts, such as by welding or fastening multiple parts together to make a beam portion, which may reduce manufacturing costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle beam comprising:
   a beam that extends along a center plane, wherein the beam comprises:
   a top side;
   a bottom side that is disposed opposite the top side;
   a web, wherein the center plane extends from the top side to the bottom side and through the web;
   a top flange that extends from the top side to the web;
   a bottom flange that extends from the bottom side toward the web;
   an intermediate flange that extends from the bottom flange to the web, wherein the bottom flange protrudes farther from the center plane than the intermediate flange; and
   a first mounting flange that extends from the top side to the web, wherein the first mounting flange protrudes farther from the center plane than the top flange, the bottom flange, the intermediate flange, and the web; and first and second kingpin mounting portions that extend from opposite ends of the beam.

2. The axle beam of claim 1 wherein the top side is disposed substantially parallel to the bottom side, the center plane is disposed substantially perpendicular to the top side and the bottom side, and the center plane bisects the top flange, the web, the intermediate flange, and the bottom flange.

3. The axle beam of claim 1 wherein the intermediate flange and the top flange protrude farther from the center plane than the web.

4. The axle beam of claim 1 wherein the bottom flange further comprises a first bottom flange side that extends from the bottom side and faces away from the center plane, and a first bottom flange connecting side that extends from an end of the first bottom flange side to the intermediate flange, wherein the first bottom flange connecting side is disposed at an oblique angle with respect to the first bottom flange side.

5. The axle beam of claim 1 wherein the top flange further comprises a top flange height that extends along the center plane from the top side to the web that is greater than a bottom flange height of the bottom flange that extends along the center plane from the bottom side to the intermediate flange.

6. The axle beam of claim 1 wherein the top flange further comprises a top flange height that extends along the center plane from the top side to the web, the intermediate flange further comprises an intermediate flange height that that extends along the center plane from the bottom flange to the web, and wherein the top flange height is greater than the intermediate flange height.

7. The axle beam of claim 1 wherein the beam further comprises a second mounting flange that extends from the top side to the web, wherein the second mounting flange protrudes farther from the center plane than the top flange, the bottom flange, the intermediate flange, and the web, and the top flange extends from the first mounting flange to the second mounting flange.

8. The axle beam of claim 1 wherein the bottom flange further comprises a first bottom flange side that extends from the bottom side and faces away from the center plane and the first mounting flange further comprises a through hole that extends from the top side toward the bottom flange, wherein at least a portion of the through hole is disposed closer to the center plane than the first bottom flange side.

9. The axle beam of claim 8 wherein the intermediate flange further comprises a first intermediate flange side that extends from the bottom flange and faces away from the center plane, wherein at least a portion of the through hole is disposed closer to the center plane than the first intermediate flange side.

10. An axle beam comprising:
a beam that extends along a center plane, wherein the beam comprises:
  a top side;
  a bottom side that is disposed opposite the top side;
  a web, wherein the center plane extends from the top side to the bottom side and through the web;
  a top flange that extends from the top side to the web;
  a bottom flange that extends from the bottom side toward the web, wherein the bottom flange comprises a first bottom flange side that extends from the bottom side and faces away from the center plane and a first bottom flange connecting side that is disposed at an oblique angle with respect to the first bottom flange side; and
  an intermediate flange that extends from the bottom flange to the web, wherein the bottom flange protrudes farther from the center plane than the intermediate flange, and the first bottom flange connecting side that extends from an end of the first bottom flange side to the intermediate flange; and
first and second kingpin mounting portions that extend from opposite ends of the beam.

11. The axle beam of claim 10 wherein the top side is disposed substantially parallel to the bottom side, the center plane is disposed substantially perpendicular to the top side and the bottom side, and the center plane bisects the top flange, the web, the intermediate flange, and the bottom flange.

12. The axle beam of claim 10 wherein the intermediate flange and the top flange protrude farther from the center plane than the web.

13. The axle beam of claim 10 wherein the top flange further comprises a top flange height that extends along the center plane from the top side to the web that is greater than a bottom flange height of the bottom flange that extends along the center plane from the bottom side to the intermediate flange.

14. The axle beam of claim 10 wherein the top flange further comprises a top flange height that extends along the center plane from the top side to the web, the intermediate flange further comprises an intermediate flange height that that extends along the center plane from the bottom flange to the web, and wherein the top flange height is greater than the intermediate flange height.

15. The axle beam of claim 10 wherein the beam further comprises a first mounting flange that extends from the top side to the web.

16. The axle beam of claim 15 wherein the beam further comprises a second mounting flange that extends from the top side to the web, wherein the second mounting flange protrudes farther from the center plane than the top flange, the bottom flange, the intermediate flange, and the web, and the top flange extends from the first mounting flange to the second mounting flange.

17. The axle beam of claim 15 wherein the first mounting flange further comprises a through hole that extends from the top side toward the bottom flange, wherein at least a portion of the through hole is disposed closer to the center plane than the first bottom flange side.

18. The axle beam of claim 17 wherein the intermediate flange further comprises a first intermediate flange side that extends from the bottom flange and faces away from the center plane, wherein at least a portion of the through hole is disposed closer to the center plane than the first intermediate flange side.

* * * * *